2,846,454
NEW STEROID COMPOUNDS

Seymour Bernstein, Pearl River, N. Y., and Ruddy Littell, River Vale, N. J., assignors to American Cyanamid Company, New York, N. Y., a corporation of Maine No Drawing. Application September 27, 1957
Serial No. 686,565

5 Claims. (Cl. 260—397.4)

This invention relates to new steroid compounds. More particularly, it relates to $\Delta^{9(11)}$-steroids of the pregnane series and methods of preparing the same.

In United States Patent No. 2,773,080, there is described the preparation of biologically active steroids. The 9α-halo-16α-hydroxy hydrocortisones and esters thereof described therein are said to be highly active without the undesirable sodium retention effect. We have now found that these highly active steroids can be prepared from dihydrocortisone. In the process of preparing the active compounds of United States Patent No. 2,773,080, by the method of the present application novel intermediates are prepared. These intermediates can be illustrated by the following general formula:

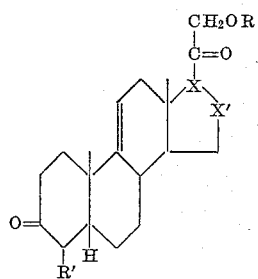

wherein R is hydrogen or a lower alkanoyl radical, R' is hydrogen or a halogen radical, and X—X' is a trivalent radical such as

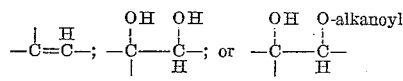

The compounds of the present invention are, in general, crystalline solids having a definite melting point. They are reasonably soluble in the usual organic solvents and comparatively insoluble in water.

The process of the present invention uses as starting material dihydrocortisone, which was described in Journal of the American Chemical Society, 70, 1454 (1948). The dihydrocortisone is reacted with an alkylene glycol, such as ethylene glycol, to produce the corresponding 3,20-bis-ethylene ketal of dihydrocortisone. The 11-keto group is then reduced to the 11β-hydroxyl group by the use of an alkali metal borohydride. The product thus obtained is acylated to produce 21-acyloxy-3,20-bis-ethylenedioxy-pregnane-11β,17α-diol. The latter compound is treated with thionyl chloride for the removal of the C-11 and 16-hydroxyl groups, and $\Delta^{9(11)}$- and $\Delta^{16}$-double bonds are formed. The ethylene ketal blocking groups are subsequently removed to yield 21-acyloxy-9(11),16-pregnadiene-3,20-dione. The latter compound, when treated with osmium tetroxide, is hydroxylated with the formation of hydroxyl groups in the alpha-configuration at the 16- and 17-positions. The 16α-hydroxy group is then acylated, giving 16α,21-dialkanoyloxy-17α-hydroxy-9(11)-pregnene-3,20-dione. The latter compound is directly brominated in the 4-position. Removal of the elements of hydrogen bromide from the latter compound yields 16α,21 - dialkanoyloxy - 17α - hydroxy - 4,9(11) - pregnadiene-3,20-dione, described in the United States patent hereinbefore mentioned. The following flow sheet describes the reactions with specific reagents in structural detail.

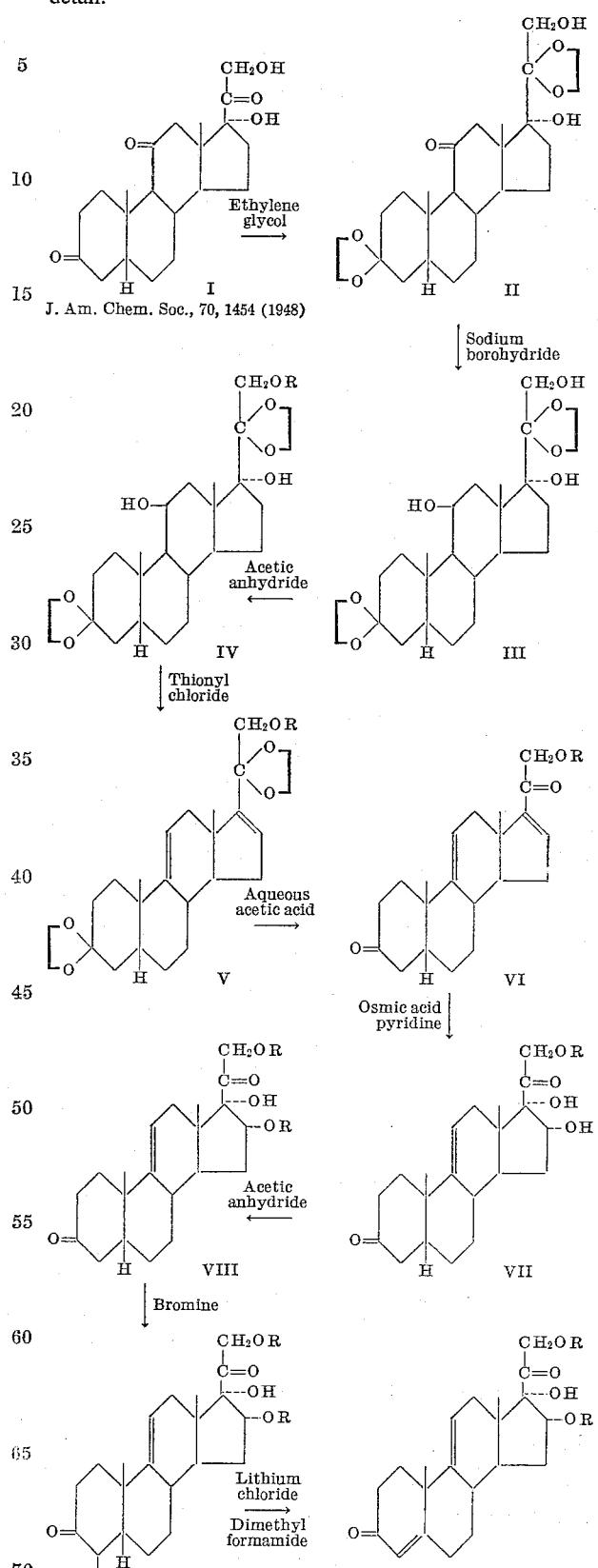

wherein R is as hereinbefore defined.

The compounds of the present invention are useful as intermediates in the preparation of the physiologically active compounds of United States Patent No. 2,773,080. The latter compounds can be used in turn to prepare the still more active compound described and claimed in United States Patent No. 2,789,118.

The following examples illustrate in greater detail the preparation of the compounds of the present invention.

*Example 1*

A mixture of 17α,21-dihydroxy-pregnane-3,11,20-trione (1.60 g.), p-toluenesulfonic acid monohydrate (45 mg.), ethylene glycol (12 ml.), and benzene (100 ml.) is stirred and refluxed with continuous water removal for five hours. After addition of sodium bicarbonate to neutralize, ethyl acetate is added, the mixture is washed to neutral with water, treated with magnesium sulfate and activated charcoal, filtered through diatomaceous earth, and evaporated to dryness under reduced pressure. Slurry with ether gives 540 mg. white powder, melting point 190°–192° C. A portion is crystallized twice from acetone-ether to give pure 3,20-bis-ethylenedioxy-17α,21-dihydroxy-pregnan-11-one, melting point 190.5°–191.5° C.

A mixture of 3,20-bis-ethylenedioxy-17α,21-dihydroxy-pregnan-11-one (2.0 g.), tetrahydrofuran (100 ml.), 2½% aqueous sodium hydroxide (15 ml.), and sodium borohydride (2.7 g.) is refluxed for 20 hours, the tetrahydrofuran removed under reduced pressure, and the resulting solution is extracted with water to neutrality. Treatment with magnesium sulfate and activated charcoal, filtration through diatomaceous earth, and removal of solvent under reduced pressure gives a glass, which upon being slurried with petroleum ether gives 1.52 g. of crystals, melting point 170.5°–171.5° C. Crystallization from acetone-petroleum ether of a 150 mg. portion gives 100 mg. of 3,20-bis-ethylenedioxy-pregnane-11β,17α,21-triol, melting point 171°–172° C.

To a cooled solution of 3,20-bis-ethylenedioxy-pregnane-11β,17α,21-triol (125 mg.) in pyridine (3 ml.) is added 1 ml. of acetic anhydride, and the solution is allowed to stand at room temperature overnight. Addition of methanol, removal of solvents under reduced pressure gives 90 mg. of white powder, melting point 166°–168° C. Two crystallizations from ether-petroleum ether yield 56 mg. of 21-acetoxy - 3,20 - bis - ethylenedioxypregnane-11β,17α-diol, melting point 166.5°–167.0° C.

To a cooled (−5° C.) solution of 21-acetoxy-3,20-bis-ethylenedioxy - pregnane - 11β,17α - diol (5.6 g.) in 25 ml. of pyridine is added 3.0 ml. of thionyl chloride, and the solution is allowed to stand at −5° C. for 16 hours. Upon being poured into ice water, an oil is formed, from which the water is decanted. The oil is dissolved in ethyl acetate, and the solution is washed four times with water, treated with magnesium sulfate and activated charcoal, filtered through diatomaceous earth, and evaporated under reduced pressure to give 5.0 g. of glass, which would not crystallize. This glass is dissolved in 70 ml. of 50% aqueous acetic acid, and the solution is heated on a steam bath for one hour. Water is added, the solution is cooled, and crude 21-acetoxy-9(11),16-pregnadiene-3,20-dione is collected by filtration. Crystallization from acetone-petroleum ether gives 2.3 g. (55%), melting point 147°–150° C., which gives a positive blue tetrazolium test.

A 300 mg. portion is crystallized three times from acetone-petroleum ether, melting point 152.5°–153.5° C. $[\alpha]_D^{25}$ +125° (C 1.21, CHCl₃); ultraviolet spectrum: $\lambda_{max}$ 238–239 mμ (ε 8,050).

*Analysis.*—Calc'd for $C_{23}H_{30}O_4$ (370.47): C, 74.56; H, 8.16. Found: C, 74.44; H, 8.34.

*Example 2*

To a solution of 21-acetoxy-9,16-pregnadiene-3,20-dione (2.22 g.) in benzene (30 ml.), and pyridine (1.0 ml.) is added 1.75 g. of osmic acid (OsO₄), and the solution is allowed to stand at room temperature for twenty hours. To this is added 100 ml. of water, 50 ml. of methanol, and 10.5 g. each of sodium sulfite and potassium bicarbonate. After the mixture is stirred vigorously for five hours, 100 ml. of chloroform is added. The mixture is filtered, and the inorganic cake is washed with 200 ml. of hot chloroform. The organic layer is washed with water to neutral, treated with anhydrous sodium sulfate and activated charcoal, filtered, and evaporated under reduced pressure to a light brown glass. Crystallization from acetone-petroleum ether gives 1.03 g. of a light brown solid, melting point 171°–177° C., decomp.

*Example 3*

The above material (1.03 g.) is dissolved in 10 ml. of pyridine and 1.0 ml. of acetic anhydride, and the mixture is allowed to stand at room temperature for 64 hours. Evaporation under reduced pressure of the solvents gives a green oil, which is dissolved in ethyl acetate. The solution is washed with dilute sulfuric acid, saturated sodium bicarbonate, and with water to neutral. Treatment with sodium sulfate and activated charcoal, filtration, evaporation to dryness under reduced pressure gives 900 mg. of green oil which resists attempts to crystallize. Chromatography on 45 g. of silica gel gives 700 mg. of glass by elution with 40% ether in benzene. Three crystallizations from acetone-petroleum ether give 275 mg. of 16α,21-diacetoxy-17α-hydroxy - 9(11) - pregnene-3,20-dione melting point 175°–190° C. $[\alpha]_D^{25}$ ±0° (C 1.09, CHCl₃).

*Analysis.*—Calc'd for $C_{25}H_{34}O_7$ (446.52): C, 67.24; H, 7.68. Found: C, 67.24; H, 7.88.

In another run with 2.7 g. of starting material, there is obtained 1.7 g. (52% yield), melting point 176°–192° C.

*Example 4*

To a solution of 16,21-diacetoxy-17α-hydroxy-9(11)-pregnene-3,20-dione (600 mg., 1.34 millimoles) in 2 ml. of dimethylformamide and 11 mg. of p-toluenesulfonic acid monohydrate is added 4.0 ml. of bromine (0.345 M in dimethylformamide, 1.38 millimoles) dropwise over five hours. After this period, 50 ml. of water is added, the mixture cooled, and 600 mg. of white glass is obtained by filtration. The product is 16α,21-diacetoxy-4-bromo-17α-hydroxy-9(11)-pregnene-3,20-dione.

*Example 5*

The product of Example 4 is dissolved in 8 ml. of dimethylformamide containing 400 mg. of lithium chloride and is heated at 100 °C. for 2½ hours under nitrogen. Addition of water gives a yellow paste, which is dissolved in ethyl acetate. The solution is washed three times with water, treated with magnesium sulfate and activated carbon, filtered, and evaporated to give 540 mg. of a glass, which does not lend itself readily to purification. Chromatography on 45 g. of silica gel gives 200 mg. of solid with elution with ether-benzene (1:1). Two crystallizations from acetone-petroleum ether give 55 mg., melting point 187°–189° C.; ultraviolet spectrum:

$$\lambda_{max}^{abs.\ alc.}\ 239\ m\mu\ (\epsilon\ 14,200)$$

One further crystallization from the same solvents gives 20 mg. of 16α,21-diacetoxy-17α-hydroxy-4,9(11)-pregnadiene-3,20-dione, melting point 193°–194° C. $[\alpha]_D^{25}$ +36°. Infrared spectral analysis shows identity with an authentic sample of the same product and admixture melting point gives no depression.

We claim:
1. A compound having the general formula:

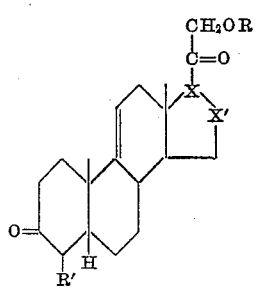

in which R is a member of the group consisting of hydrogen and lower alkanoyl radicals, R' is a member of the group consisting of hydrogen and halogen and X—X' is a member of the group consisting of

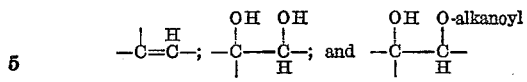

radicals.

2. The compound 21 - acetoxy - 9(11),16-pregnadiene-3,20-dione.
3. The compound 21 - acetoxy - 16α,17α - dihydroxy-9(11)-pregnene-3,20-dione.
4. The compound 16α,21 - diacetoxy - 17α - hydroxy-9(11)-pregnene-3,20-dione.
5. The compound 16α,21 - diacetoxy - 4 - bromo - 17α-hydroxy-9(11)-pregnene-3,20-dione.

No references cited.